(12) United States Patent
Bauer et al.

(10) Patent No.: US 7,115,187 B1
(45) Date of Patent: *Oct. 3, 2006

(54) METHOD AND DEVICE FOR CONTINUALLY PRODUCING A SUSPENSION OF CELLULOSE IN AN AQUEOUS AMINE OXIDE

(75) Inventors: Ralf-Uwe Bauer, Rudolstadt (DE); MUwe Kind, Rudolstadt (DE)

(73) Assignee: Alceru Schwarza GmbH, (DE)

( * ) Notice: Subject to any disclaimer, the term of this patent is extended or adjusted under 35 U.S.C. 154(b) by 238 days.

This patent is subject to a terminal disclaimer.

(21) Appl. No.: 10/221,589

(22) PCT Filed: Sep. 29, 2000

(86) PCT No.: PCT/DE00/03413

§ 371 (c)(1), (2), (4) Date: Oct. 14, 2003

(87) PCT Pub. No.: WO01/70819

PCT Pub. Date: Sep. 27, 2001

(30) Foreign Application Priority Data

Mar. 20, 2000 (DE) .............................. 100 13 777

(51) Int. Cl.
*C08B 1/00* (2006.01)
*D01D 1/02* (2006.01)
*D01F 2/00* (2006.01)
*C08J 5/18* (2006.01)
*C08L 1/02* (2006.01)

(52) U.S. Cl. ...................... 162/102; 162/9; 162/157.6; 536/56; 106/217.5; 264/349; 366/9; 366/79; 366/83; 366/91; 366/137.1; 366/178.1; 366/178.2; 366/178.3; 366/271; 366/341

(58) Field of Classification Search ................... 162/9, 162/56, 65, 157.1, 157.6, 157.7, 10, 70, 72, 162/81, 57, 158, 102; 8/115.51; 536/56; 106/155.23, 166.42; 366/9, 341, 137.1, 178.1, 366/178.2, 178.3
See application file for complete search history.

(56) References Cited

FOREIGN PATENT DOCUMENTS

| AT | 402 410 B | 9/1996 |
|---|---|---|
| DE | 694 23 756 T2 | 5/2000 |

(Continued)

OTHER PUBLICATIONS

U.S. Appl. No. 10/088,773, filed Jun. 2002, Bauer et al.*

*Primary Examiner*—Steven P. Griffin
*Assistant Examiner*—Anna L. Kinney
(74) *Attorney, Agent, or Firm*—Steven J. Hultquist; Intellectual Property Technology Law

(57) ABSTRACT

The invention relates to a method for continually producing a suspension of cellulose in an aqueous tertiary amine oxide. The method includes (a) mixing cellulose and an amine oxide-free aqueous phase to form a cellulose suspension in a mass ratio in the range of 1:3 to 1:40, (b) dehydrating the cellulose suspension, wherein the dehydrated cellulose suspension has a cellulose content in the range of 20 to 80 percent-by-mass; (c) mixing the cellulose suspension with an aqueous amine oxide while the cellulose suspension is falling through a vertical fall zone to obtain an aqueous amine oxide-cellulose suspension with an amine oxide content in the range of 70 to 80 percent-by-mass; and (d) conveying the aqueous amine oxide-cellulose suspension through a horizontal shear zone. The invention also relates to a device for carrying out this method.

11 Claims, 1 Drawing Sheet

FOREIGN PATENT DOCUMENTS

| | | |
|---|---|---|
| DE | 694 23 756 T2 | 7/2000 |
| EP | 0 700 462 B1 | 3/2000 |
| GB | 2 303 134 | 10/1998 |
| WO | WO 94/28217 | 12/1994 |
| WO | WO 96/33221 | 10/1996 |
| WO | WO 200009563 A1 * | 2/2000 |

* cited by examiner

METHOD AND DEVICE FOR CONTINUALLY PRODUCING A SUSPENSION OF CELLULOSE IN AN AQUEOUS AMINE OXIDE

CROSS-REFERENCE TO RELATED APPLICATIONS

This application is filed under the provisions of 35 U.S.C. §371 and claims the priority of International Patent Application No. PCT/DE00/03413 filed Sep. 29, 2000, which in turn claims priority of German Patent Application No. 100 13 777.6 filed Mar. 20, 2000.

BACKGROUND OF THE INVENTION

1. Field of Technology

The invention relates to a method for the continuous preparation of a cellulose suspension in an aqueous tertiary amine oxide for use in the Lyocell method. The invention also relates to a device for performing said method.

2. Description of Related Art

It is known to prepare cellulose form- and spinning masses from cellulose solutions in amine oxides, preferably in N-methylmorpholine-N-oxide and a non-soluble agent for cellulose, preferably water. By forming the solution and drawing and regenerating the cellulose, products are obtained for diverse use in the textile- and non-textile area (see W. Berger, Options and Limits of Alternative Cellulose Dissolution and -Drawing, Lanzinger Reports 74 (1994) 9, pages 11 to 18). BISFA assigned the generic term "Lyocell" to fibers produced with this method.

WO 94/28217 discloses a discontinuous method for the preparation of a cellulose suspension in aqueous amine oxide, where comminuted cellulose and an amine oxide solution are mixed by a rotor with radial stirring elements in a horizontal mixing chamber. The duration per batch is stated as 21 minutes. This method of operation is disadvantageous because two such mixing chambers have to be operated in parallel due to the continuous load of the subsequent dissolution step. Furthermore, the complete emptying of the mixing chambers leads to difficulties.

It is also known from WO 96/33221 to prepare a cellulose suspension in aqueous N-methylmorpholine-N-oxide (NMMO) by mixing the comminuted cellulose in an annular layer mixer directly with the aqueous NMMO, such as 75 percent-by-mass NMMO. The formed suspension is brought to dissolution in a separate film extruder. The disadvantage of the annular layer mixer is that only comminuted, essentially dry cellulose can be used. If the cellulose contains water, the formation of layers in the mixer is difficult due to the mixing with NMMO solution, which was added separately. The water has to be separated thermally. The soluble components of the cellulose reach the spinning solution and lead to disadvantageous properties in the cellulose products. Because the suspension is transported as a layer, the throughput relative to the cross-section of the apparatus is low.

From DE 198 37 210.8, it is known to suspend the cellulose in water prior to the formation of a suspension in amine oxide solution, and to partially separate it again from the suspension agent after a certain amount of time. Then the wet cellulose material is first conveyed through a horizontal shear zone in the absence of amine oxide, and then together with amine oxide. This method of operation requires a relatively long shear zone and thus a significant effort with respect to apparatus. The formation of a uniform suspension is complicated by the fact that the aqueous oxide is fed into a cellulose material that completely fills the available volume of the apparatus.

The present invention is based on the problem to provide a method and a device for the continuous preparation of a cellulose suspension in an aqueous tertiary amine oxide with a reduced apparatus effort for the formation of suspensions and the activation of cellulose for use in the Lyocell process. Especially, the throughput of the cellulose material relative to the volume of the shear zone is supposed to be increased, and thus the preparation time of the suspension is supposed to be reduced. Other advantages are shown in the following description.

Thus, the invention is based on a method for the continuous preparation of a cellulose suspension in an aqueous tertiary amine oxide for use in the Lyocell process, where (a) a cellulose suspension is formed from cellulose and an amine oxide-free phase in a mass ratio in the range of 1:3 to 1:40, (b) the cellulose suspension is dehydrated into a material with a cellulose content in the range of 20 to 80 percent-by-mass, and (c) the wet cellulose material is mixed with enough aqueous amine oxide and conveyed through a horizontal shear zone so that after the mixing, a suspension with an amine oxide content in the liquid phase in the range of 70 to 80 percent-by-mass is obtained, whereby the suspension essentially completely fills the available conveying diameter in the shear zone.

In accordance with the invention, this method is characterized in that in step (c), aqueous amine oxide in finely dispersed form is added to the wet cellulose material in a fall zone only partially filled with the cellulose material, and the cellulose material mixed with the amine oxide is introduced into the shear zone. In a variant of the method according to DE 198 37 210.8, the first part of the shear zone, where the cellulose material is conveyed and homogenized in the absence of NMMO, is obsolete. Furthermore, the aqueous amine oxide is not introduced into a shear zone that is essentially completely filled with the suspension, but rather only into the upstream fall zone. The cellulose material fills the fall zone only partially, so that the introduction of the amine oxide simultaneously leads to a pre-distribution of the amine oxide in the wet cellulose material. It is said pre-distribution of the amine oxide that allows a shortening of the shear zone for the formation of a uniform suspension for the subsequent formation of the solution, which follows the fall zone. Compared to the method of operation according to DE 198 37 210.8, this results in a shortening of the shear zone by approximately one third, and a reduction of investment costs by approximately 10 to 15 percent.

According to the preferred embodiment of the method in accordance with the invention, the aqueous amine oxide is injected into the fall zone. In that way, the falling particles of the wet cellulose material are enveloped by the aqueous amine oxide and a good pre-mix is obtained, which allows a shortening of the subsequent homogenization frame in the shear apparatus. Preferably, N-methylmorpholine-N-oxide-monohydrate is injected into the fall zone.

Surprisingly, it was found that the quality of the pulp was improved, despite the reduction of the process steps and/or the production time of the suspension, which can be determined by means of the very good swelling condition of the cellulose particles in the three-substance-mixture cellulose/NMMO/water at the end of the shear zone. This is attributed to the fact that the fine dispersion of the amine oxide in the fall zone shortens the time period otherwise required until the NMMO solution acts on the cellulose particles, so that the overall swelling of the particles has already progressed farther at the end of the shear zone. The quantity of the aqueous amine oxide added in the fall zone is coordinated with the starter cellulose quantity such that the amine oxide content in the aqueous phase of the formed suspension is in the target range of 70 to 80 percent-by-mass.

SUMMARY OF THE INVENTION

In the aforementioned step (a), the supplied cellulose material (in roll- or sheet form) can be broken down with water in a pulper or homogenizer. In this step, the reactivity and/or accessibility of the cellulose chains for the amine oxide can be improved with the addition of enzymes. The dehydration in step (b) can be achieved by means of belt-type press, screw compactor, roller filter or centrifuges. Preferably, the dehydration is continued until the cellulose content is in the range of 45 to 55 percent-by-mass. The water content, which still fluctuates slightly following dehydration, can be equalized during transport to the weight scale. Because the aqueous amine oxide that is used is frequently a regenerate solution that was reclaimed from a used precipitation bath, the regeneration of the precipitation bath can focus on the formation of an amine oxide concentrate in the required concentration. The short-term shearing in a short shear zone achieves a sufficient size reduction and homogenization of the cellulose particles that is not possible in the known ring layer mixer. Generally, it is possible in accordance with the invention to use an aqueous amine oxide with a mol ratio of amine oxide to water in the range of 1:1 to 1:2.2. The most concentrated amine oxide, i.e., especially NMMO monohydrate, is used with aqueous cellulose that was broken down with water, for example, prior to the suspension in accordance with the invention, and/or was pre-treated enzymatically or thermally.

DETAILED DESCRIPTION OF THE INVENTION

The preparation of the pulp is appropriately performed at a temperature in the range of 75 to 100° C. At these temperatures, the reduction of the cellulose and the breakdown of the amine oxide is low; on the other hand, the increased temperature favors the homogenization and the uniform mixing of the wet cellulose and the amine oxide. The tempered suspension can be brought to solution without any significant change of temperature in a subsequent step by water evaporation under vacuum.

BRIEF DESCRIPTION OF DRAWINGS

The illustration shows schematically a facility for performing the method in accordance with the invention.

According to the preferred embodiment of the method in accordance with the invention, the pulping is performing in a continuous run and the suspension is then pulled off continuously at the end of the shear zone and introduced into the dissolution step without the need for an intermediate container.

Figure 1:
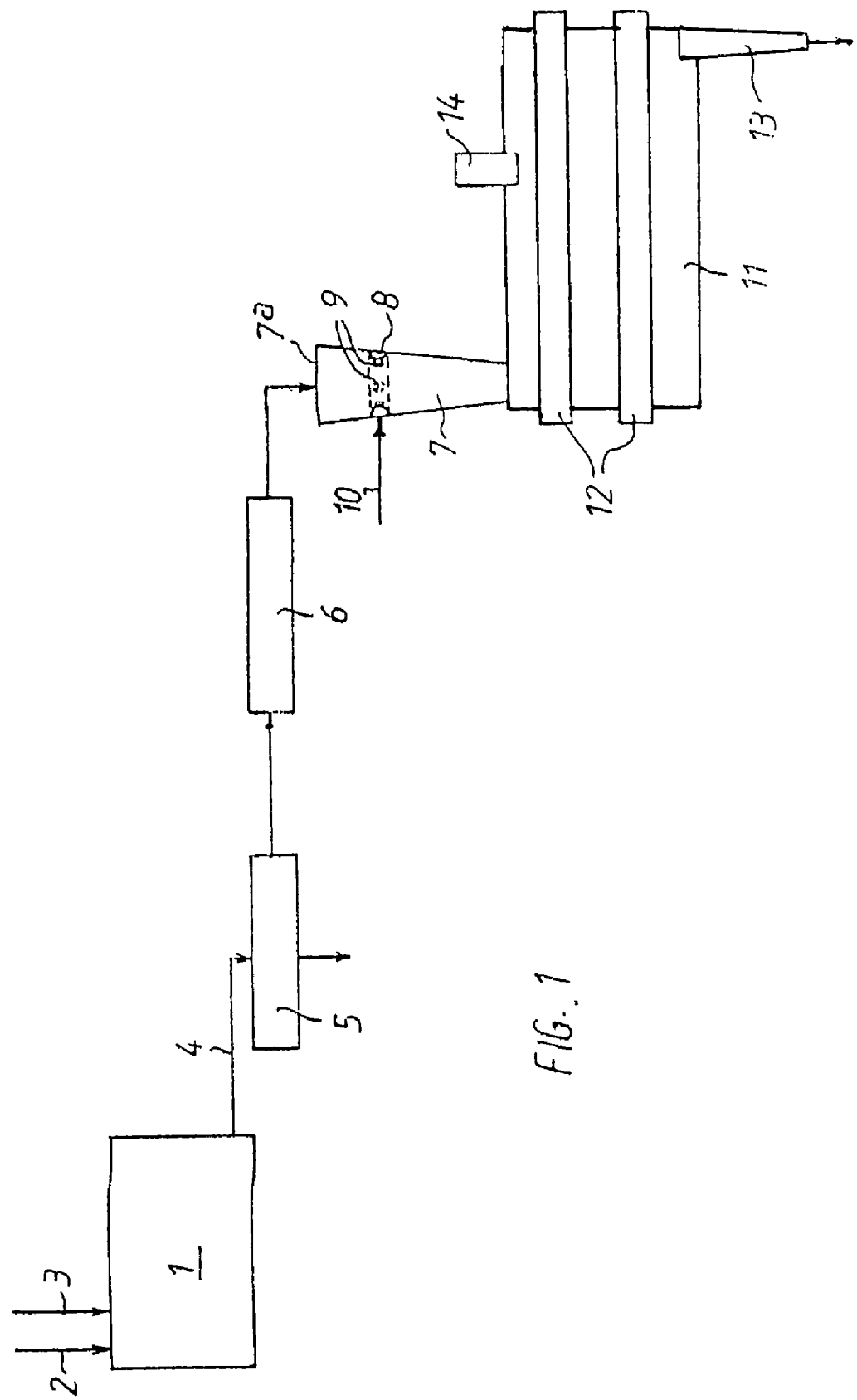

Preferably, work in the shear zone proceeds with a standing time in the range of 5 to 30 minutes, especially in the range of 10 to 15 minutes.

The method can be performed with the addition of additives, such as stabilizers. Said stabilizers can also be used in the fall zone, together with the amine oxide.

The invention is furthermore based on a device having (a) a mixing apparatus with mixing organs, feed nozzles for cellulose and aqueous suspension agent and discharge nozzles for the suspension, (b) a separation apparatus connected to the mixing apparatus for the partial separation of the suspension agent from the cellulose, and (c) a shear apparatus with horizontal shafts equipped with shearing tools, a feed system for the cellulose material from the separation apparatus at the one end of the shear apparatus and a discharge nozzle for the suspension at the other end of the shear apparatus.

In accordance with the invention, this device is characterized in that the charge system is a fall pipe for forming a fall zone, and has nozzles directed into its cavity to introduce the aqueous amine oxide into the cellulose material. While the charge system of the shear apparatus according to DE 198 37 210.8 is a funnel to introduce the cellulose material, which has the form of bulk material, into the shear apparatus, the charge system in accordance with the invention is provided to form a fall zone through which the particles of the cellulose material fall, and which therefore offers the possibility to spray these particles with the aqueous amine oxide so that a pre-mix of the wet cellulose material and the aqueous amine oxide is created already in the fall zone, and said premix is drawn as such into the shear apparatus. The charge system can be a vertical pipe that narrows cylindrically or conically toward the shear apparatus. When said premix enters the shear apparatus, the mixing of the cellulose particles with the amine oxide has already progressed farther than when the amine oxide is introduced into the shear apparatus with the method in accordance with DE 198 37 210.8. Thus, it is possible to shorten the length of the apparatus significantly without any negative impact on the swelling condition of the cellulose particles in the suspension.

Preferably, at least one loop line equipped with nozzles is arranged in the charge system. The amine oxide is injected into the fall pipe through said loop line. In that way, it is of advantage that the particles or aggregate particles of the wet cellulose material falling through the pipe are as small as possible. If desired, the partially dehydrated cellulose material can be guided through a crusher prior to entering the fall pipe.

Appropriately, the loop line, of which there is at least one, is connected to a heated supply line. This prevents the aqueous amine oxide from solidifying in the lines and nozzles.

The shear apparatus can be a horizontal, multiple-shafted reactor such as a multi-screw dissolver with self-cleaning heat exchange surfaces, a reactor with 2 to 8 engaging screws that rotate in the same direction, or a multi-chamber mixer.

The invention is explained in greater detail in the following by means of the illustration and an example.

The illustration shows schematically a facility for performing the method in accordance with the invention. A mixing container 1 is continually charged with cellulose through the nozzle 2 and with water as a suspension agent through the nozzle 3. The aqueous cellulose suspension formed in the container 1 travels through the line 4 to a belt-type press 5, where it is dehydrated to a liquid content of 50%. The wet cellulose material obtained on the belt-type press travels as fleece through a weight scale 6 and reaches a funnel-shaped fall-pipe 7, which has, in the shown embodiment, an internal loop line 8 with nozzles 9 directed into the inside of the pipe. The loop line 8 is charged with aqueous NMMO through a heated supply line 10. When the wet cellulose material falls through the pipe 7, it is wetted and charged with the injected aqueous amine oxide so that a mixture of aqueous cellulose material and amine oxide is created at the lower end of the fall pipe 7, which also contains air cushions. Connecting to the fall pipe 7 is a multiple-shaft apparatus 11, where the mixture drawn into the apparatus is mixed further by the shearing—and conveyer elements (not shown) arranged on the shafts 12, and is then conveyed to the discharge pipe 13. The air drawn into the fall pipe 7 with the mixture and some of the water vapor are drawn off through the nozzle 14. A dissolution apparatus connects to the discharge pipe 13. Said dissolution apparatus is constructed similar to the multiple-shaft apparatus 11. The formation of the cellulose solution takes place in said dissolution apparatus. The apparatus 11, as well as the dissolution apparatus (not shown) have a heating blanket (not shown) to maintain the desired mixing- or dissolution temperature.

EXAMPLE

In a turbo dissolver, 70 kg of a spruce sulfite cellulose material (Cuoxam-DP 510; α-cellulose content>90%) are broken down and homogenized with soaking liquid in a liquor ratio of 1:20. The suspension is pumped into a supply tank with the help of a slush pump and diluted to a pulp consistency of 10 grams per liter at a temperature of 50° C. On a wet fleece arrangement with subsequent lump breaking, a cellulose fleece with a solid matter content of 50% is prepared and continually introduced into a double-screw apparatus via a fall duct at a throughput of 33.5 kg of cellulose per hour. The homogenization of the cellulose takes place during the transport to the weight scale. Over a heated supply line, NMMO-monohydrate is added simultaneously in a quantity of 127.3 kg per hour through nozzles in the fall pipe. In the subsequent shearing and homogenization zone of the double-screw apparatus, the cellulose/water suspension is mixed uniformly with the NMMO monohydrate. A pulp with a 76% NMMO content is obtained, and a spinning solution with 12.9% cellulose content can be prepared in a subsequent evaporization step.

In the quality assessment of the suspension following the pulper, the swelling condition of the cellulose particles was measured according to the ASG standard. A maximum of 3 non-swelled cellulose particles per $cm^3$ were determined in the pulp, which, according to the quality standard, meets the rating "very good."

The quality evaluation of the spinning solution formed from the suspension was performed in the V 300 microscope by Hund, Wetzlar with an evaluation unit (JVC video camera and printer). The number of undissolved cellulose particles of the spinning sample is stated as 1 $cm^3$ each. The following quality categories apply:

| No. of undissolved cellulose particles/cm | Rating |
|---|---|
| 0 to 5 | 1 |
| 6 to 10 | 2 |
| 11 to 15 | 3 |
| 15 | not spinnable |

The spinning solution of this example did not contain any undissolved particles/$cm^3$. The cellulose solution is well suited for the direct processing into fibers, filament yarns and sheets according to the dry-wet spinning process.

The invention is not limited to the embodiment shown in FIG. 1. The aqueous amine oxide can not only be injected from the circumference (casing) of the fall zone vertically or angular upward or downward to the direction of fall, but also at the entry 7$^a$ of the fall pipe parallel and/or angular to the direction of fall. In the injection from the circumference, this is appropriately done in the upper half of the fall pipe 9. The charging speed of the fall pipe is coordinated with the conveying speed of the multiple-shaft apparatus preferably such that there is a fill in the lowest part of the fall pipe 7 prior to entry into the multiple-shaft apparatus 11, so that as little air as possible is pulled into the multiple-shaft apparatus.

What is claimed is:

1. A method for the continuous preparation of a suspension of cellulose in an aqueous tertiary amine oxide for use in the Lyocell process, the method comprising:
    (a) mixing cellulose and an amine oxide-free aqueous phase to form a cellulose suspension in a mass ratio in the range of 1:3 to 1:40,
    (b) dehydrating the cellulose suspension, wherein the dehydrated cellulose suspension has a cellulose content in the range of 20 to 80 percent-by-mass;
    (c) mixing the cellulose suspension with an aqueous amine oxide, wherein the aqueous amine oxide is injected into the cellulose suspension while the cellulose suspension is falling through a vertical fall zone that is only partially filled by the cellulose suspension, wherein enough aqueous amine oxide is mixed with the cellulose suspension to obtain an aqueous amine oxide-cellulose suspension with an amine oxide content in the range of 70 to 80 percent-by-mass; and
    (d) conveying the aqueous amine oxide-cellulose suspension through a horizontal shear zone so that the aqueous amine oxide-cellulose suspension fills the available cross-sectional conveyance area in the shear zone essentially completely.

2. The method in accordance with claim 1 wherein N-methylmorpholine-N-oxide-monohydrate is injected into the vertical fall zone.

3. The method in accordance with claim 1, the amine oxide suspension dwell time in the shear zone is in the range of 5 to 30 minutes.

4. The method according to claim 1, wherein the cellulose suspension is dehydrated into a material with a cellulose content in the range of 45–55 percent-by-mass.

5. A device for continuous preparation of a suspension of cellulose in an aqueous tertiary amine oxide for use in the Lyocell process the device comprising:
    (a) a mixing apparatus comprising a mixing container, feed nozzles for introducing cellulose and aqueous suspension agents into a mixing vessel to form a cellulose suspension and discharge nozzle for removal of the cellulose suspension,
    (b) a separation apparatus that is communicatively connected to the mixing apparatus comprising means to partially separate the suspension agent from the cellulose to form a dehydrated cellulose suspension;
    (c) a charge system communicatively connected to the separation apparatus comprising a vertical fall pipe having at least one nozzle positioned in the vertical fall pipe for introducing an aqueous amine oxide into the vertical fall pipe for premixing with the dehydrated cellulose suspension to form an aqueous amine oxide-cellulose suspension; and
    (d) a shear apparatus communicatively connected to the charge system for receiving the aqueous amine oxide-cellulose suspension, the shear apparatus comprising horizontal shafts equipped with shear tools and a discharge nozzle for discharge of the amine oxide cellulose suspension after passing through the horizontal shafts.

6. The device in accordance with claim 5, wherein the at least one nozzle is connected to a loop line for transporting the aqueous amine oxide to the nozzles.

7. The device in accordance with claim 6, wherein the loop line is connected to a heated supply line.

8. The device according to claim 5, wherein the shear apparatus comprises a homogenization frame that is shortened in length relative to a homogenization frame in a shearing apparatus not connected to a charge system with a vertical fall pipe and charging nozzles connected therein.

9. The device according to claim 8, wherein the shear apparatus is shorter by approximately one third.

10. The device according to claim 5, further comprising a dissolution apparatus for receiving the discharged aqueous amine oxide cellulose suspension from the shear apparatus.

11. The device according to claim 5, wherein the vertical fall pipe is conically shaped and narrows towards the shear apparatus.

* * * * *

UNITED STATES PATENT AND TRADEMARK OFFICE
CERTIFICATE OF CORRECTION

PATENT NO. : 7,115,187 B1 Page 1 of 1
APPLICATION NO. : 10/221589
DATED : October 3, 2006
INVENTOR(S) : Ralf-Uwe Bauer et al.

It is certified that error appears in the above-identified patent and that said Letters Patent is hereby corrected as shown below:

In the Title page, first column, in the identification of Inventors, Item [75] "MUwe Kind" should be -- Uwe Kind --.

In the Title page, first column, in the identification of Assignee, Item [73] "Alceru Schwarza GmbH, (DE)" should be -- Zimmer AG, (DE) --

In the Title page, first column, Other Publications in the Foreign Application Priority Data, "100 13 777" should be -- 100 13 777.6 --.

Signed and Sealed this

Thirteenth Day of March, 2007

JON W. DUDAS
*Director of the United States Patent and Trademark Office*